United States Patent Office

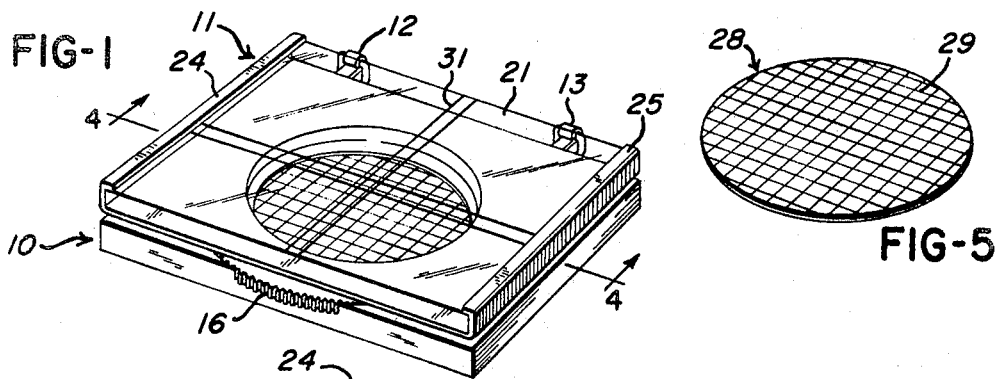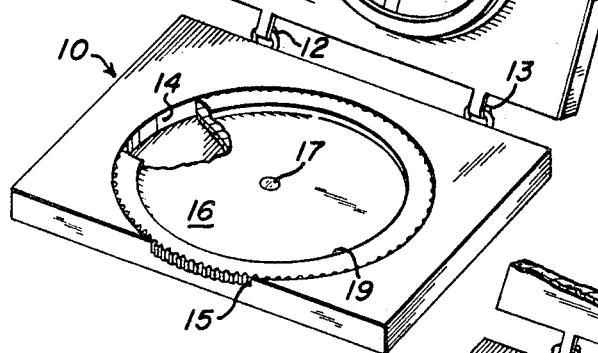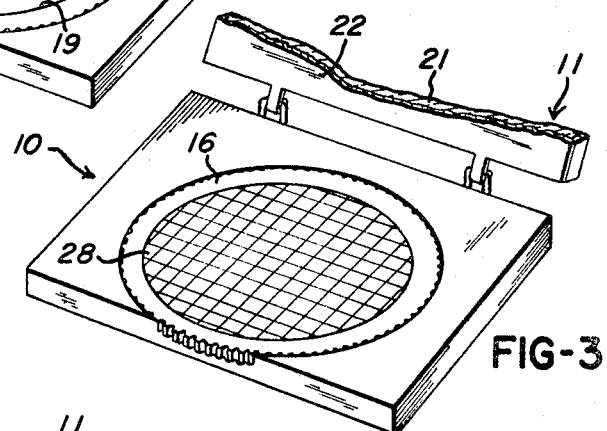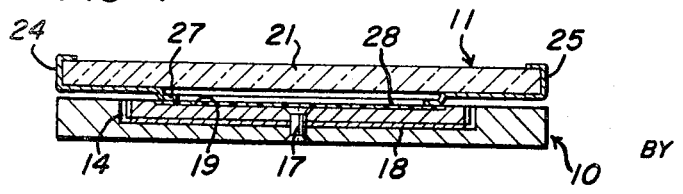

3,436,140
Patented Apr. 1, 1969

3,436,140
HOLDER FOR CONTAMINATION SAMPLING PATCH
Thomas J. Lord, Middletown, Ohio, assignor to United Aircraft Products, Inc., Dayton, Ohio, a corporation of Ohio
Filed Nov. 9, 1966, Ser. No. 593,194
Int. Cl. G02b 21/34
U.S. Cl. 350—94          8 Claims

ABSTRACT OF THE DISCLOSURE

A holder having the character of a microscope slide adapted to receive a filter patch for particulate counting in which the patch is protected from atmospheric contamination and other introduced error while exposing the patch for full surface, low tolerance counting.

---

This invention relates to holders for contamination sampling filter patches.

Manufacturing specifications may require that a part be produced with a low degree of environmental contamination. It is customary in these instances that the part be assembled or formed under "clean room" conditions and that the extent of contamination be checked to learn if it is within tolerable limits. A method of checking is to flush the part with a solvent. This is subsequently put through a fine filter, termed a patch. The filter patch is transferred to a microscope slide for examination as to the kind and number of particulate intercepted by it. Counting may be aided by a grid pattern on the patch.

In the described method, errors can be introduced by airborne solids settling on the filter patch during examination or while awaiting examination. Also, dust on the slide covering the patch may be counted along with the filtered material. Still further, distortion may be a problem due to the filter patch wrinkling from the wetting and drying effects of the solvent.

The instant invention has in view a filter patch holder obviating the above mentioned causes of introduced error. The holder lends itself to use as a microscope slide. It has a dust cover, formed with a sight opening whereby a filter patch placed therein is protected while awaiting examination and during examination. Further, the dust cover is constructed and arranged to make pressural contact with the filter patch in a manner to prevent wrinkling thereof while continuing to expose a large area of the patch to the view through the sight opening. At the same time a transparent part of the cover plate overlying the sight opening is spaced vertically above the filter patch in a manner to place dust particles on the underside thereof out of the plane of the patch. These particles accordingly will be out of focus in a microscopic examination of the filter patch surface. Finally, the filter patch is supported on a rotary table or wheel accessible from outside the holder in order that a mounted filter patch may be aligned for proper viewing. Crosshairs on the transparent part of the dust cover facilitate such alignment.

Other objects and structural details of the invention will appear from the following description, when read in connection with the accompanying drawings, wherein:

FIG. 1 is a view in perspective of a patch holder in accordance with the illustrated embodiment of the invention, the holder being shown closed with a filter patch contained therein;

FIG. 2 is a view similar to FIG. 1, the holder being shown open and the filter patch removed;

FIG. 3 is a view similar to FIG. 2, partly broken away, showing the holder with a filter patch placed therein;

FIG. 4 is a view in cross section, taken substantially along the lines 4—4 of FIG. 1; and FIG. 5 is a view in perspective of a filter patch of the kind held in the device of the invention.

Referring to the drawings, the holder of the illustrated embodiment of the invention has a compact construction adapting it in a closed condition for use as a microscope slide. It comprises lower and upper components 10 and 11 serving respectively as base and cover elements. Hinges 12 and 13 along what may be considered the back edges of the respective components provide for a pivotal raising and lowering of the cover to achieve a closed position of the holder as shown in FIG. 1 and an open position thereof as shown in FIG. 2. The base 10 has a rectangular configuration and may be solid as shown. Its upper surface is flat and planar except that occupying a substantial part of such surface is a circular recess 14. An opening 15 communicates the recess 14 to the exterior of the holder through the front edge of base portion 10. Seated in the recess 14 is a rotary table or wheel 16. A centrally positioned rivet 17 connects the wheel 16 to the base 10 and provides a center post about which the wheel may rotate. The wheel 16 is concentrically positioned in recess 14 but is offset toward the front edge of base 10 whereby a peripheral portion of the wheel projects through opening 15. By the application of finger pressure from outside the holder, therefore, the wheel 16 may be turned about pivot 17. The peripheral edge of the wheel may be roughened, as shown, to facilitate such action. A lower surface of the wheel 16 may rest on a bearing pad 18. In the upper surface of the wheel, and occupying a substantial part of the overall diameter thereof is a shallow recess 19.

The upper or cover component 11 is comprised in the main of a body 21 corresponding approximately in configuration to the base 10 but made of a transparent material, for example glass. A frame 22, made of metal, plastic or like material attaches to the body 21. The frame 22 comprises a flat sheet-like portion 23 lying against the underside of body 21 and terminating at its ends in upturned channel portions 24 and 25 folding over and interfitting with the ends of body 21. Means integral with what may be considered the back edge of the frame 22 project therefrom to form part of the hinges 12–13. In the plate-like portion 23, centrally positioned between the ends of the frame and offset toward what may be considered the front edge thereof is a through opening 26. The material of such plate-like portion immediately adjacent to opening 26 is extruded or displaced outwardly away from body 21 in a manner to define an annular pressure pad 27. Opening 26 and pressure pad 27 are located to be aligned with the wheel 16 in a closed position of the holder, with the pad 27 being received within shallow recess 19 in the wheel.

The recess 19 provides a seat for a filter patch 28, the diameter of such recess and the diameter of the filter patch approximately corresponding so that the patch is installed on the wheel 16 with a moderately close fit in recess 19. The filter patch is disc-like in shape and is made of a flexible plastic or like material. Its thickness corresponds approximately to the depth of recess 19. In accordance with its functional purposes, the patch 28 is formed as a fine filter, having numerous microscopic openings therein for flow therethrough of a liquid while intercepting liquid borne particles. Intersecting lines 29 form a grid pattern on the surface of the filter patch, particulate counting being done by reference to individual squares of such pattern.

After the solvent or like liquid has been filtered through a patch 28, it is placed on the wheel 16 of the instant holder and the cover member 11 closed thereon. The holder accordingly assumes the form of a microscope slide. Suitably mounted in a microscope the particles on the surface of the filter patch are noted and counted, the grid-like surface of the patch being viewed from above the holder through the transparent body 21 and through sight opening 26.

In closing the cover 11 upon base 10 the cover comes to rest with pressure pad 27 engaging a peripheral portion of the filter patch 28. The patch is pressed thereby to a seat in recess 19 and by reason of the downwardly projected character of the pad 27 the transparent body 21 is held vertically spaced above the filter patch. The result is that wrinkling of the filter patch as might be caused by too rapid drying is inhibited, and, further, that dust particles on the underside of body 21 not only cannot contaminate the surface of the filter patch but are in a plane to be out of focus in the microscopic examination of the patch surface. They are readily differentiated, therefore, from particles on the patch.

The wheel 16 serves as an alignment table by which the filter patch may be positioned for best examination of its squares by the microscope without the technician having to touch the patch with his fingers and without having to open the holder. Crosshairs 31 on the upper surface of transparent body 21 facilitate adjustment of the wheel so that a patch mounted thereon may be disposed with the vertical and horizontal lines of its grid pattern corresponding to vertical and horizontal lines drawn through the patch holder.

It will be understood that the instant holder is susceptible of substantial modification within the scope of the invention as disclosed. For example, the body 21 need not be made entirely of glass but could be made rather of a conventional opaque material with a lens installed to align with opening 26. Similarly, the alignment wheel 16 might be eliminated and a simple flat seat provided for the filter patch on the upper surface of base 10. Finally, the frame 22 need not be constructed as indicated. The pressure pad 27 might be made otherwise separable from the body 21 or made a unitary part thereof.

What is claimed is:

1. A holder for use in the microscopic examination of filter patches, said patches being planar fluid permeable wafer-like elements, a base providing a recessed flat seat therein for a patch, a closure member positionable upon said base and having a transparent part and a projecting portion aligning with said recessed flat seat, said member being adjustable to an open or closed position in the former of which it is raised relative to said base to allow said patch to be placed on or removed from said base and in the latter of which it is lowered to a position of rest in an overlying covering relation to said flat seat and patch thereon, said closure member when in a closed position providing a complete protective covering for the patch, said projecting portion on said hinged positionable closure member acting in a closed position of said member to apply a holding pressure to said patch at the edge thereof maintaining the patch on said flat recessed seat and spacing the transparent part of said closure member vertically above said flat seat and patch thereon.

2. A holder according to claim 1, characterized by means accessible from the exterior of said holder for relatively rotating the filter patch in the closed position of said closure member, the transparent part of said member and the patch having surface grids aligned by rotation of the patch as described.

3. A holder according to claim 1, characterized by a relatively rotatable wheel installed in said base with its axis normal to the horizontal plane of said base, an upwardly facing surface of said wheel providing the flat seat for the patch, a peripheral part of said wheel projecting through a side of said base to be accessible in a closed position of said closure member to rotate said wheel, the transparent part of said member and the patch having surface grids aligned by rotation of said wheel as described.

4. A holder according to claim 1, wherein the base has an upper surface in which is a circular recess opening through one side edge of the base, characterized by a wheel installed in said recess relatively to rotate therein and held thereby from relative lateral shifting motion, a peripheral portion of said wheel projecting through said opening to be accessible for manual rotary adjustment of said wheel, said wheel having an upwardly facing surface in which is a recess receiving the filter patch, the transparent part of said closure member and the patch having surface grids aligned by rotation of said wheel as described.

5. A holder according to claim 1, characterized in that said downwardly projecting means is formed to engage the filter patch outwardly of the center thereof, exposing a substantial area of the patch to view through the transparent part of said closure member, the transparent part of said member having crosshair lines for use as a gauge in the proper aligning of a grid pattern on the filter patch.

6. A holder according to claim 1, wherein said closure member is comprised of a body of transparent material, said projecting portion being in a frame mounted on said body, said frame mounting to the underside of the body and having an outstruck portion to engage said flat seat on said base in a closed position of said member, said outstruck portion defining a sight opening through which a filter patch on said seat is viewed.

7. A holder according to claim 1, characterized in that the means in said recessed flat seat is provided by a wheel accessible from outside the holder to be rotated relatively to said base, the filter patch having a surface grid pattern thereon and the transparent part of said closure member having crosshair lines thereon, said wheel being rotated properly to align the filter patch by reference to the crosshairs on said closure member.

8. A holder for use in the microscopic counting of particulate over substantially the full area of a filter patch in a single examination thereof, said patches being planar fluid permeable wafer-like elements, a base providing a flat recessed seat therein for the patch, a cover member positionable upon said base and having a transparent part and a projecting portion aligning with said recessed flat seat, said member being adjustably placed in a superposed position of rest on said base, said cover member having a continuous cross section providing a complete protective covering over said seat and the patch thereon, said projecting portion on said cover member engaging the patch on a relatively narrow marginal area thereof to apply a holding pressure to said patch maintaining it on said flat seat and at the same time spacing at least a part of said cover member vertically above said flat seat and patch thereon, said hold down means defining an open sight area aligning with an underlying patch and through which the entire area thereof inwardly of said marginal area is visible for full counting of particulate thereon, the cover member being made of a transparent material in said open sight area, and means for locating said cover member relative to said base member, said cover member is comprised of a unitary body of transparent material, an opaque frame mounted to the underside of said body having an annular depressed flange forming said hold down means, said flange aligning with the said marginal area of the patch, the patch being viewed through the transparent cover member body, using said flange as a sight opening.

References Cited

UNITED STATES PATENTS

| | | | |
|---|---|---|---|
| 1,882,919 | 10/1932 | Robbins | 350—92 |
| 2,637,817 | 5/1953 | Herbert | 350—93 |
| 2,899,046 | 8/1959 | Cox | 206—420 XR |
| 3,171,883 | 3/1965 | Jones | 350—238 X |
| 3,350,979 | 11/1967 | Detweiler | 350—94 X |

DAVID SCHONBERG, *Primary Examiner.*

P. R. GILLIAM, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,436,140                                                                    April 1, Thomas J. Lord It is certified that error appears in the above identified patent and that said Letters Patent are hereby corrected as shown below:

Column 3, line 54, cancel "hinged".

Signed and sealed this 7th day of April 1970.

(SEAL)
Attest:

Edward M. Fletcher, Jr.                            WILLIAM E. SCHUYLER,
Attesting Officer                                                Commissioner of Pat